United States Patent [19]

Bailly

[11] 4,002,787
[45] Jan. 11, 1977

[54] FOAMED POLYMERIC ARTICLE AND METHOD FOR MAKING THE SAME

[76] Inventor: Richard L. Bailly, Beechwood Circle, Boxford, Mass. 02132

[22] Filed: June 24, 1974

[21] Appl. No.: 482,340

[52] U.S. Cl. .................... 428/35; 156/218; 156/245; 156/290; 215/1 C; 249/79; 249/95; 264/241; 264/321; 425/817 R; 428/315; 428/36

[51] Int. Cl.² ............ B29C 27/02; B29D 23/00; B29D 27/00; B65D 9/10

[58] Field of Search ......... 264/321, DIG. 18, 51, 264/241; 156/218, 245, 290; 428/35, 315, 36; 215/1 C; 425/817; 249/79, 95

[56] References Cited

UNITED STATES PATENTS

| | | | |
|---|---|---|---|
| 2,722,719 | 11/1955 | Alstadter | 264/321 X |
| 2,767,436 | 10/1956 | Noland et al. | 264/321 UX |
| 2,813,053 | 11/1957 | Tuomala | 156/218 |
| 2,898,632 | 8/1959 | Irwin et al. | 264/DIG. 14 |
| 3,069,725 | 12/1962 | Root | 264/51 |
| 3,315,018 | 4/1967 | Commeyras | 264/321 X |
| 3,344,222 | 9/1967 | Shapiro et al. | 264/321 |
| 3,374,298 | 3/1968 | Studen | 264/321 X |
| 3,432,380 | 3/1969 | Weber | 264/321 X |
| 3,544,675 | 12/1970 | Belle Isle | 264/321 |
| 3,553,068 | 1/1971 | Coale | 264/321 X |
| 3,650,868 | 3/1972 | Murota | 156/218 X |
| 3,658,615 | 4/1972 | Amberg | 156/218 |
| 3,673,033 | 6/1972 | MacDaniel et al. | 264/321 X |
| 3,712,844 | 1/1973 | Ratten et al. | 264/321 X |
| 3,792,137 | 2/1974 | Seto | 264/321 X |
| 3,811,984 | 5/1974 | Joonase | 156/290 X |
| 3,819,796 | 6/1974 | Webster et al. | 264/321 |

FOREIGN PATENTS OR APPLICATIONS 781,046   8/1957   United Kingdom ............ 264/321

OTHER PUBLICATIONS

Brydson; J. A., "Plastics Materials", Princeton, N.J., D. Van Nostrand, c. 1966, pp. 33–37, 123, 124.

Primary Examiner—Philip Anderson
Attorney, Agent, or Firm—Kenway & Jenney

[57] ABSTRACT

A hollow shaped article is formed from a preformed sheet of foamed thermoplastic material wherein a joint is formed along the length of two abutting edges of the preformed sheet at the sheet's surfaces but inwardly of the surfaces the abutting edges are left unbonded. The process for forming the articles is characterized by flexing the preformed sheet into the desired general shape, placing it into a two-part mold, and then heating it in two heating steps.

12 Claims, 4 Drawing Figures

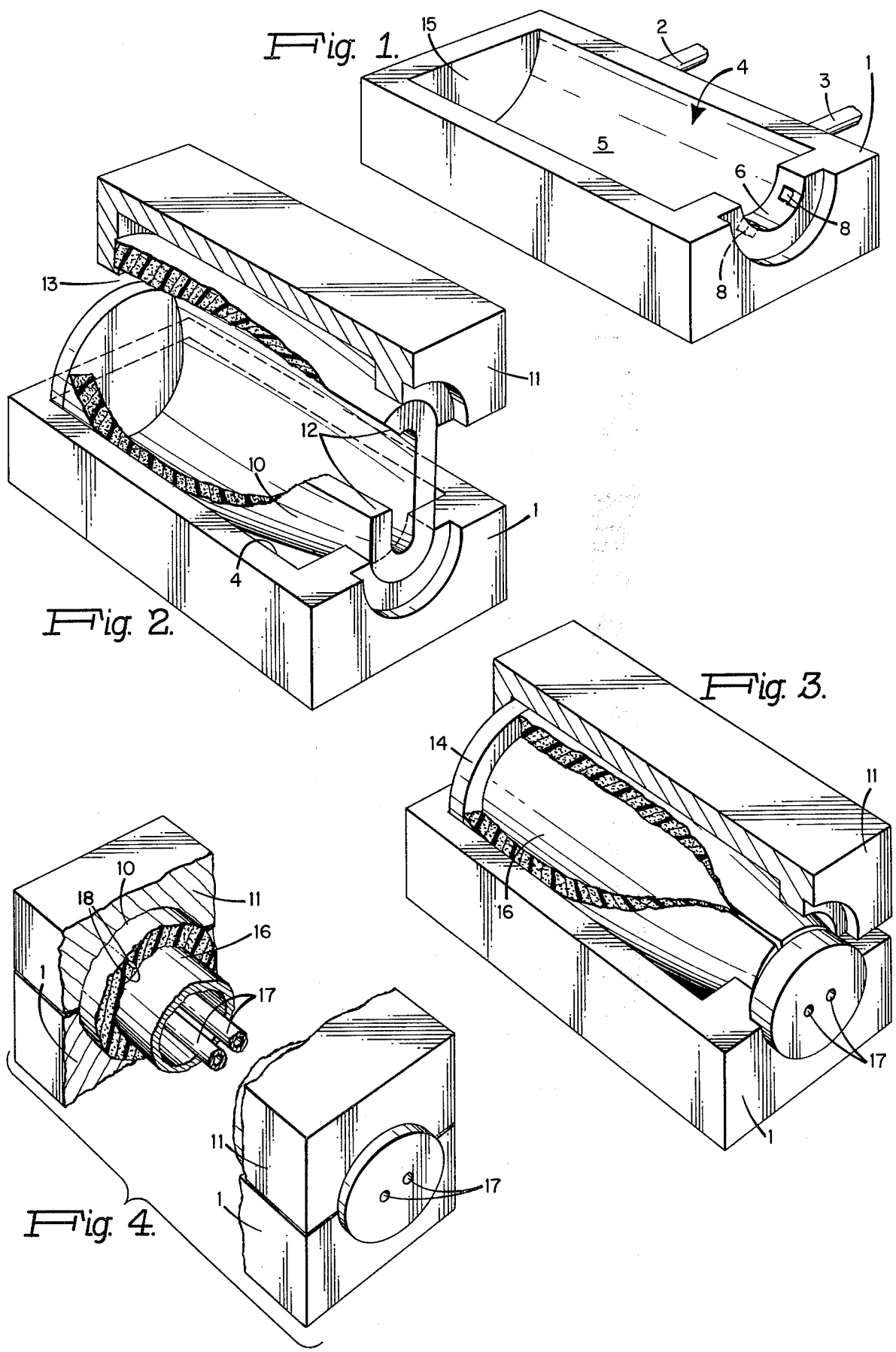

FOAMED POLYMERIC ARTICLE AND METHOD FOR MAKING THE SAME

The invention herein described was made in the course of or under a contract with the Department of the Army.

The present invention relates to a process for forming an article such as a hollow container from foamed thermoplastic polymer compositions and to the method for making the same.

At the present time, there is no known process for forming articles from foamed polyethylene by direct extrusion other than processes for forming polyethylene foam sheets. Shaped articles presently are formed from foamed polyethylene by a process known as "fabrication" wherein discrete foam polyethylene pieces are cut and bonded by hand until the desired shape is obtained. Generally bonding is effected with an adhesive which causes long drying times and requires storage rooms to dry the final product. Therefore such processes are undesirably inconvenient and time consuming. Accordingly, it would be highly desirable to provide a process for forming finished articles from foamed polymeric sheets including foamed polyethylene sheets which eliminate hand fabrication involving cutting and bonding of the cut pieces.

SUMMARY OF THE INVENTION

The present invention is based upon the discovery that a shaped article can be formed from foamed polymeric thermoplastic sheets, including foamed polyethylene sheets, by subjecting the sheet to heat and pressure in a mold with a cavity having the desired outside and inside shape of the article. The article is formed in a two-step heating procedure. The foam sheet is flexed and placed in a mold comprising two mold sections so that the edges of the foam sheet to be joined extend into the cavity in a first mold section while the sheet is contoured to the general shape of the cavity in the second mold section. In the first step, the two mold sections are brought together so that about 80% to 90% of the sheet is enclosed by the mold sections and while the mold sections are heated to a temperature wherein the surface begins to flow but not so high a temperature that will cause the foam structure to collapse. For example when employing foam polyethylene, typically employed temperatures are between about 150° F and 205° F. The mold sections are maintained in this position for a period of time of between about 1 to 3 minutes to preheat the foamed sheet thereby increasing its flexibility. Thereafter the mold sections are contacted under pressure to surround the sheet to cause the skin surfaces of the sheet to flow and, along the entire length of the mating edges, to fused together, and subsequently, on cooling, the edges are joined together at the surfaces.

DESCRIPTION OF SPECIFIC EMBODIMENTS

Surprisingly, it has been found that joints of sufficient strength can be formed when only a small portion of the sheet thickness has been caused to become liquid and subsequently fused. Thus, there is no need for heating the sheet throughout the thickness thereof along the ends being joined. Articles formed by the process of this invention are formed from slabs or sheets of foamed thermoplastic polymer having a density and thickness as desired. Generally, the foamed polymer sheets employed have a density ranging between about 2 and about 10 pounds per cubic foot and have a thickness generally between about 0.5 and about 5 inches. However, it is to be understood that this invention can be employed with any foam thermoplastic material regardless of density or thickness. Suitable foamed thermoplastic polymers include polystyrene, vinyl polymers, and copolymers such as polyvinyl chloride and polyolefins such as polyethylene and polypropylene. This invention is particularly useful with polyethylene foamed sheets. It is to be understood that the polymeric compositions useful herein can contain the usual additives such as fillers, dyes, pigments and stabilizers.

This invention will be more fully described with reference to the accompanying figures.

FIG. 1 is an isometric view of a mold section useful in the process of this invention.

FIG. 2 is a side view, partially cut away of two mold sections having a flexed foam sheet placed therein.

FIG. 3 is a side view of the two mold sections, partially cut away approximately ninety percent closed around the foam sheet and a mandrel.

FIG. 4 is a partially cut away side view of the mold sections completely closed and enclosing the mandrel and foam sheet.

Referring to FIG. 1, the mold section 1 is made from any suitable mold material such as cast aluminum and is provided with any conventional means for heating and cooling such as by the delivery of a hot fluid such as steam through conduit 2 and the delivery of a cold fluid such as water through conduit 3 into channels within the mold section (not shown). The mold 1 is provided with a cavity 4 shaped to conform to the outside surface of one-half the desired container shape. The cavity 4 consists of a body cavity section 5 and a neck cavity section 6. The neck cavity section 6 is shaped to correspond to the desired closure means to be employed for the final container. As shown in FIG. 1, the mold section 1 is shaped to form a container having a lug closure means. Thus, the cavity section 6 is provided with two small holes 8 to form the lugs in the final container. Other suitable closure means include snap closures, tongue and groove closures, insert closures, or the like.

The process of the present invention will be described with reference to FIGS. 2 through 4. Initially, as shown in FIG. 2, a flat, foamed thermoplastic polyethylene sheet 10 is flexed and placed in the mold section 1 while mold section 1 and mold section 11 are positioned sufficiently close together so that the longitudinal edges 12 of the sheet 10 extend into the cavity 13 of mold section 11. In addition, a foam polymeric disk 14 is placed into the cavity 4 and adjacent the surface 15 of the mold section 1. Generally, the mold sections 1 and 11 are preheated prior to inserting the flat sheet 10 therein.

In the second step, the preheated mold sections 11 and 1 are heated to a temperature between about 150° F and about 205° F in order to heat the flat sheet 10. During this heating step, the mandrel 16 is positioned within the space formed by the flexed sheet 10 and also is heated such as with hot fluid introduced through conduit 17 to approximately the same temperature as the mold sections 1 and 11. During this heating, the mold sections 1 and 11 are positioned to enclose about 80 to 90% of the sheet for a period of time between about 1 and about 3 minutes. It has been found that this initial step is necessary in order to position the sheet satisfactorily around the mandrel and within the molds during the final heating step. The mold sections 1 and 11 then are completely closed, as shown in FIG. 4, and the sheet is heated to a temperature between about 205° F and about 210° F for a period of time between about 9 and about 11 minutes within the mold. By operating under these conditions, the outside and inside surfaces of the flat sheet are caused to flow so that subsequently, when the formed container is cooled to room temperature, the inner and outer surfaces of the container will have a desirable skin texture which is slightly more dense than the original flat sheet.

The molding pressures to which the foam is subjected can be supplied by any conventional means such s hydraulic or pneumatic means. Normally employed molding pressures are within the range of 900 to 1100 psi. When operating under these conditions, the edges 12 become fused at the sheet's surfaces 18 along the length of the final container. Surprisingly, it has been found that satisfactory adhesion of the two edges is obtained merely by causing the inner and outer surfaces 18 to flow at a depth of no more than about ⅛ of an inch. Throughout the remainder of the thickness of the sheet along the edges 12, the edges are not fused together. Furthermore, the disk 14 becomes fused to the flexed foam sheet to form the bottom of the final container. Similarly, at the juncture of the disk and the flexed sheet, fusion of the flat sheet and the disk does not occur throughout the entire thickness of the flat sheet. Thus, it has been found possible by the process of this invention to eliminate the need for providing a heating means along the entire thickness of the fused edges.

While this invention is described above specifically with reference to forming a hollow container, it is to be understood that any shaped article can be formed by the process of this invention such as a hollow tube so long as discrete sections are joined by being fused while the surface is heated to form a relatively smooth surfce. Furthermore, the operating temperature and pressures set forth above are particularly useful for polyethylene foam. It is to be understood that the particular temperature and pressures employed depend upon the particular polymeric foam composition to be formed. In any event the temperature employed in the first step is sufficient to permit subsequently bending the foam sheet to the final shape without breaking the sheet but while substantially retaining the foam structure in the sheet. In the second heating step, the temperature is maintained so that the sheet surface is caused to flow to render the surface smooth and to permit the adjacent sheet edges to be joined without substantially destroying the foam structure.

I claim:

1. Article of manufacture of a desired shape comprising a sheet of foamed polymeric thermoplastic material having at least a pair of edges in abutting engagement, said article having a surface layer having a density greater than the density of the interior of said foamed material, said surface layer being fused at said pair of abutting edges to form a bond therebetween, said abutting edges being unbonded inwardly from said surface layer.

2. Article of manufacture according to claim 1 wherein said article is hollow and wherein a foamed polymeric thermoplastic member is bonded to said hollow article to form a hollow container having a closed end and an open end.

3. Process for forming a hollow shaped article from a preformed sheet of foamed thermoplastic material having a suitble density and thickness, the surfaces of said sheet terminating in a pair of longitudinal edges and a pair of widthwise edges, said process being characterized by the steps of:
   a. flexing said sheet such that said longitudinal edges are brought closely adjacent one another and a hollow shape having an interior surface and an exterior surface is formed;
   b. placing said flexed sheet within the cavities of the mating mold sections of a two-part mold, said mold cavities having the desired outside shape of the article to be formed whereby the sheet is contoured to the general shape of the mold cavities;
   c. positioning a mandrel in the hollow space defined by said interior surface of said sheet, said mandrel conforming to the desired interior shape of the article;
   d. bringing the mold sections together to enclose a substantial portion of said foamed sheet while heating the mating mold sections and the mandrel to heat said sheet to a temperature sufficient to permit the weight of the upper mold section to position said sheet within the cavity defined by the mandrel and the mold sections without breaking the sheet or effecting substantial thermal destruction of the foamed sheet;
   e. closing the sections of said two part mold together under pressure to enclose all of said foamed sheet and mandrel, and to cause said longitudinal edges to abut one another;
   f. heating the mandrel and mold sections to a temperature sufficient to cause said sheet surfaces to flow under the pressure to which the sheet is subjected without destroying the foam structure of the sheet, and, at the abutting edges, to fuse together, whereby, on cooling, a bond is formed along the length of said abutting edges at the sheet's surfaces but inwardly from said surfaces, said longitudinal edges remain unbonded.

4. The process of claim 3 wherein the thickness of said preformed sheet is at least 0.5 inch.

5. The process of claim 3 wherein the density of said preformed sheet is in the range between 2 to 10 lbs./ft.$^3$ 6. The process of claim 3 wherein said mold sections are preheated prior to placing said flexed foam sheet into the mold cavities.

7. The process of claim 3 wherein said thermoplastic material comprises polyethylene.

8. The process of claim 7 wherein in step (d) the mold sections are brought together so that about 80% to 90% of the sheet is enclosed by the mold sections.

9. The process of claim 3 wherein the shaped article is a container open at one end, the process further comprising: placing a member of suitable size and shape in said mold cavities in contact with a widthwise edge remote from the open end of the container to be formed, whereby, when said interior and exterior surfaces of said sheet are heated to a temperature sufficient to cause said surfaces to flow, a bond is formed between said member and said contacted widthwise edge.

10. The process of claim 9 wherein said member comprises polyethylene.

11. The process of claim 9 wherein the mold cavities comprise a body cavity and a neck cavity, the latter cavity conforming to the desired closure means to be employed for the container formed.

12. Process for forming a hollow shaped article from a preformed sheet of foamed polyethylene material having a thickness greater than 0.5 inch and a density between 2 and 10 lbs./ft.$^3$, the surfaces of said sheet terminating in pair of longitudinal edges, said process being characterized by the steps of:
   a. flexing said sheet such that said longitudinal edges are brought closely adjacent one another and a hollow shape having an interior and exterior surface is formed;
   b. placing said flexed sheet within the mold cavities of the preheated mating mold sections of a two-part mold, said cavities having a desired outside shape of the article to be formed whereby the sheet is contoured to the general shape of said mold cavities;
   c. positioning a mandrel in the hollow space defined by said interior surface of said sheet, said mandrel conforming to the desired inside shape of the article to be formed;
   d. bringing said mold sections together to enclose 80% to 90% of said foamed sheet while heating the mating mold sections and the mandrel to heat said sheet to a temperature sufficient to permit the weight of the upper mold section to position said sheet within the cavity defined by the mandrel and the mold sections, without breaking the sheet or effecting substantial thermal destruction of the foamed sheet;
   e. closing the section of said two-part mold together under pressure to enclose all of said foamed sheet and mandrel, and to cause said longitudinal edges to abut one another;
   f. heating the mandrel and mold sections to a temperature sufficient to cause said sheet surfaces to flow under the pressure to which the sheet is subjected without destroying the foam structures of the sheet, and, at the abutting edges, to fuse together, whereby, on cooling, a bond is formed along the length of said abutting edges at the sheet's surfaces but inwardly from said surfaces, said longitudinal edges remain unbonded.

* * * * *